United States Patent
Ogushi et al.

(10) Patent No.: US 7,586,634 B2
(45) Date of Patent: Sep. 8, 2009

(54) IMAGE FORMING SYSTEM AND FINISHING APPARATUS

(75) Inventors: Takehiro Ogushi, Hachioji (JP); Tetsuo Hirata, Hachioji (JP); Motoki Nakamichi, Hachioji (JP); Norishige Kato, Hachioji (JP); Yasushi Saitsu, Hachioji (JP)

(73) Assignee: Konica Minolta Business Technologies, Inc. (JP)

( * ) Notice: Subject to any disclaimer, the term of this patent is extended or adjusted under 35 U.S.C. 154(b) by 1132 days.

(21) Appl. No.: 11/049,078

(22) Filed: Feb. 1, 2005

(65) Prior Publication Data

US 2006/0007476 A1    Jan. 12, 2006

(30) Foreign Application Priority Data

Jul. 12, 2004   (JP)   ............................. 2004-204482

(51) Int. Cl.
*G06F 3/12*   (2006.01)
*G06K 15/00*   (2006.01)

(52) U.S. Cl. ...................... 358/1.15; 358/1.13; 358/1.14

(58) Field of Classification Search .................. 358/1.1, 358/1.2, 1.9, 1.13, 1.14, 1.15, 1.18; 347/1, 347/2, 3, 5, 14, 23; 399/1, 8, 361, 362, 410, 399/407, 408, 403

See application file for complete search history.

(56) References Cited

U.S. PATENT DOCUMENTS 5,363,175 A * 11/1994 Matysek ...................... 399/77
5,726,897 A *  3/1998 Tammi et al. ............... 700/221

FOREIGN PATENT DOCUMENTS

JP   2002-247252   8/2002

* cited by examiner

*Primary Examiner*—Dov Popovici
(74) *Attorney, Agent, or Firm*—Squire, Sanders & Dempsey L.L.P.

(57) ABSTRACT

An image forming system having an image forming apparatus for forming an image onto a recording medium, and a plurality of finishing apparatus for processing the recoding medium ejected from the image forming apparatus, each finishing apparatus of the plurality of finishing apparatuses includes, a communication device for controlling communication between the image forming apparatus and the finishing apparatus itself, a first communication line for sending and receiving data between the finishing apparatus and the image forming apparatus through the communication device for controlling the finishing apparatus, and a second communication line adapted for bypassing the communication device arranged in the finishing apparatus.

20 Claims, 8 Drawing Sheets

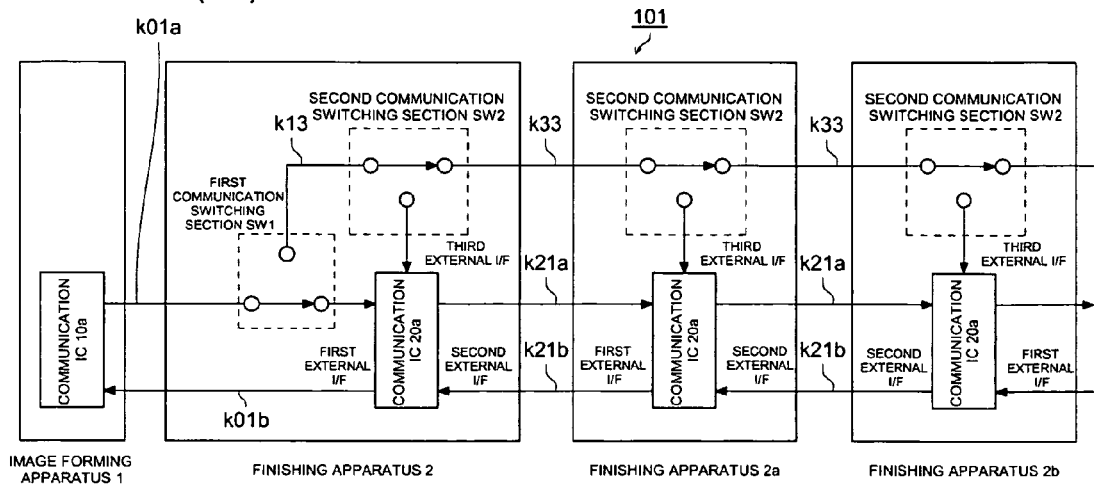
FIG. 3(a)
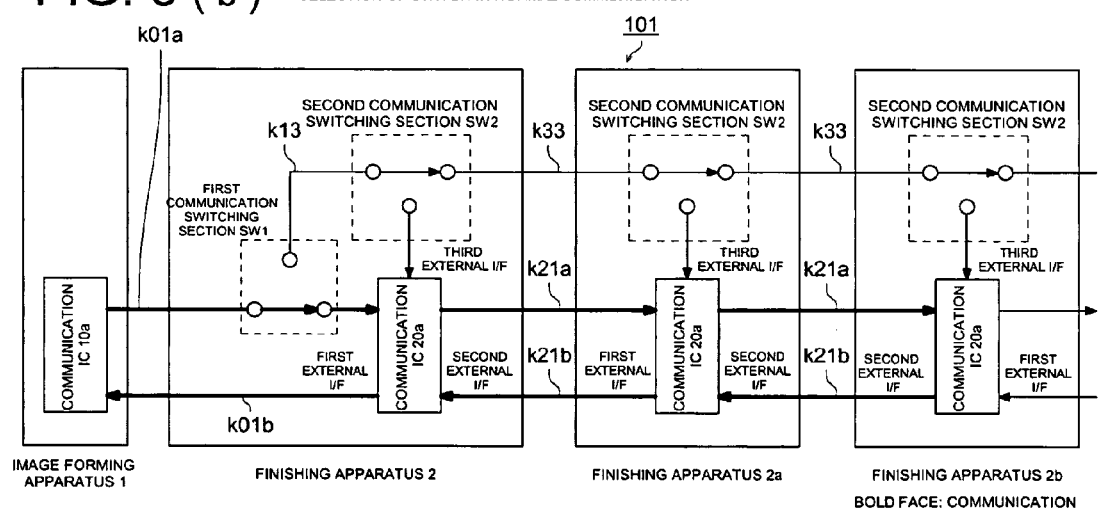
FIG. 3(b) SELECTION OF SWITCH IN NORMAL COMMUNICATION
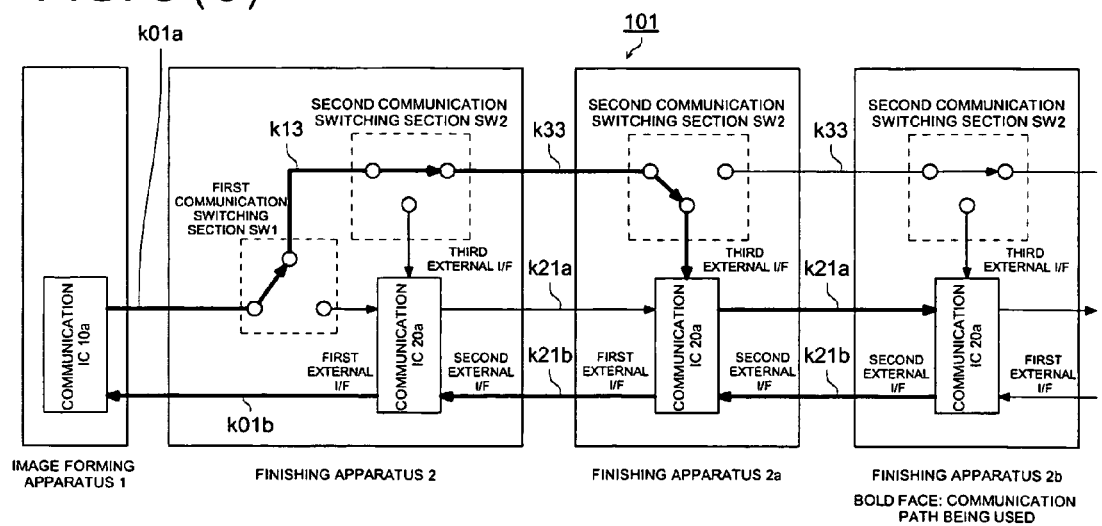
FIG. 3(c) SELECTION OF SWITCH WHEN REWRITING FINISHING APPARATUS 2a FIG. 7 (b) SELECTION OF SWITCH IN NORMAL COMMUNICATION FIG. 7 (c) SELECTION OF SWITCH WHEN REWRITING FINISHING APPARATUS 2a

IMAGE FORMING SYSTEM AND FINISHING APPARATUS

FIELD OF THE INVENTION

The present invention relates to an image forming system and a finishing apparatus.

BACKGROUND OF THE INVENTION

In an image forming system having an image forming apparatus for forming an image on a recording medium based on image data, and a finishing apparatus for applying a process of finishing to the recording medium with the image formed thereon, a plurality of finishing apparatuses are arranged in series on the image forming apparatus as the basic unit of the image forming system, in order to perform a finishing step having any one of punching, folding, stapling and book binding processes, or a combination of such processes, in some cases.

In such cases, control communication or data communication from the image forming apparatus to a finishing apparatus located in the end position is carried out via a communication control sections of the finishing apparatuses located in a series of finishing apparatuses. Data communication includes transmission/reception of a large volume of data needed for a change of the combination of the finishing apparatuses and updating of the program including revision of the operation program, in addition to the normal communication. Particularly in the communication for the aforementioned configuration, relaying is necessary and this takes a long processing time. Further, it has been difficult to adjust timing for receiving and sending the communication data according to the prior art.

Patent Document 1 discloses an image forming apparatus wherein a dedicated built communication device is used to transfer a control program to a plurality of extended peripheral devices. This art allows a substantial reduction in the time for updating the program in a digital copying machine equipped with various options.

[Patent Document 1] Japanese Laid-Open Patent Publication No. 2002-247252

The aforementioned art is effective when a plurality of peripheral devices is connected in one-to-one relationship. However, in the configuration wherein a plurality of finishing apparatuses are arranged in series on the rear stage of the image forming apparatus and the control signal is transmitted via the communication IC of each finishing apparatus, a delay is caused in signal transmission and a longer processing time is required. Thus, there has been a long felt need for a further development to solve such problems.

SUMMARY OF THE INVENTION

An object of the present invention is to overcome the above drawback.

An structure of the present invention will be attained by an image forming system having an image forming apparatus for forming an image onto a recording medium and a plurality of finishing apparatuses for processing the recoding medium ejected from the image forming apparatus.

Each finishing apparatus of the plurality of finishing apparatuses comprising:

a communication device for controlling communication between the image forming apparatus and the finishing apparatus itself, a first communication line for sending and receiving data between the finishing apparatus with the image forming apparatus through the communication device for controlling the finishing apparatus, and a second communication line adapted for bypassing the communication device arranged in the finishing apparatus.

BRIEF DESCRIPTION OF THE DRAWINGS

FIG. 3 (a) is a diagram showing a communication path of the image forming system 101, FIG. 3 (b) a diagram showing a communication path of the image forming system 101 in the normal communication mode, FIG. 3 (c) a diagram showing a communication path for rewriting the operation program of a finishing apparatus 2a of the image forming system 101;

FIG. 7 (a) is a diagram of the communication path of the image forming system 101a; FIG. 7 (b) a diagram showing the communication path of the image forming system 101a in the normal communication mode; FIG. 7 (c) a diagram showing the communication path for rewriting the finishing apparatus 2a operation program of the finishing apparatus 2a in the image forming system 101a.

DETAILED DESCRIPTION OF THE INVENTION

Embodiment 1

Figure 1:
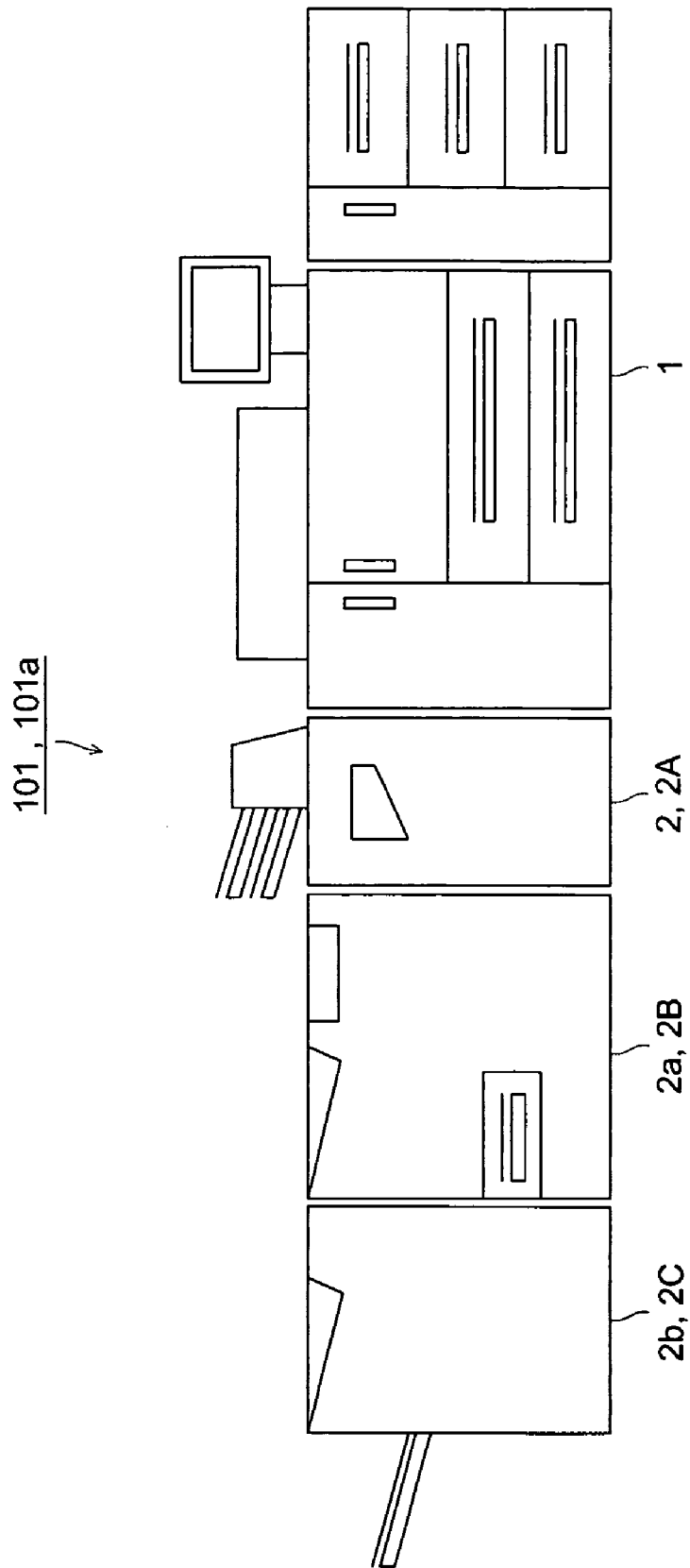
FIG. 1 is an external view representing an image forming system of the present invention.

Referring to the drawings, the following describes the details of the image forming system 101 of the present invention. The scope of the present invention is not limited to those drawings.

FIG. 1 is an external view representing an image forming system of the present invention. Image forming system 101 comprises image forming apparatus 1 connected with finishing apparatus 2, finishing apparatus 2a and finishing apparatus 2b in series. Recording media such as paper on which an image is formed by image forming apparatus 1 is fed sequentially to each finishing apparatus where they are processed, and is ejected from a terminal or an ejection tray on the way.

Figure 2:
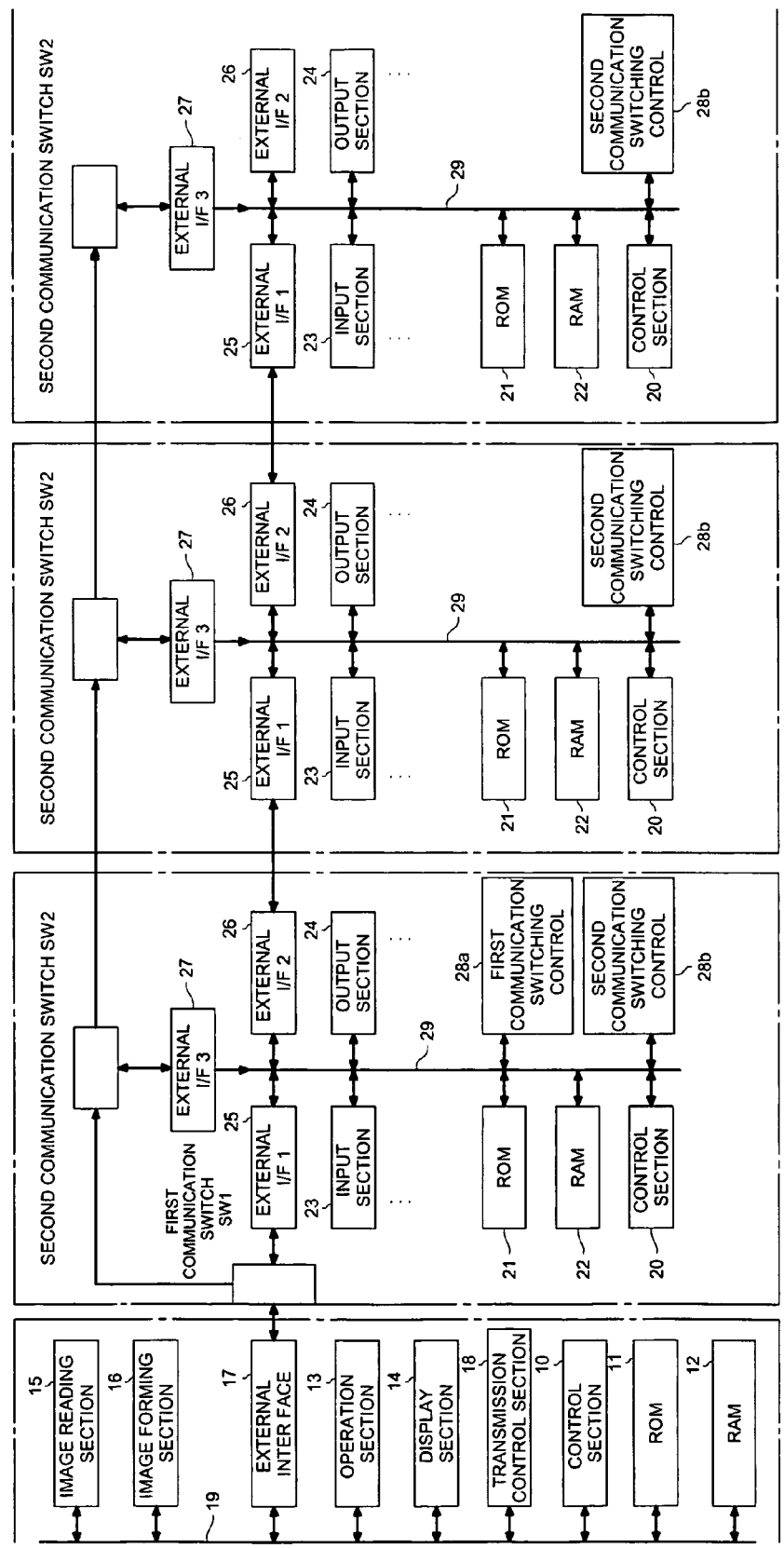
FIG. 2 is a diagram showing the internal structure of the image forming system 101 of the present invention.

FIG. 2 is a diagram showing the overall structure of image forming system 101 of the present invention. Image forming system 101 is a network multifunction machine having image forming apparatus 1, capable of communicating with the LAN (Local Area Network) connected to a PC (personal computer) via communication network 3 having a function of copying onto recording paper by a scanner or printing by data communication and finishing apparatuses 2-2b, each connected in series via an external interface, for applying the process of finishing to the recording paper with an image recorded thereon.

Communication network 3 will be LAN, but may include for example, the Internet or WAN (Wide Area Network). It may also include a telephone line, radio communication line, ISDN (Integrated Services Digital Network), line network, wide-area communication line network, leased line, mobile communication network, communication satellite line, CATV (cable television) line, optical communication line, or Internet service provider connecting them.

Image forming apparatus 1 contains a control section 10, ROM 11, RAM 12, operation section 13, display section 14, image reading section 15, image forming section 16, external interface 17 and transmission control section 18, and is electrically connected with them through a bus 19.

Control section 10 includes a CPU (Central Processing Unit) and communication IC 10*a* to be described later. The CPU has an internal RAM (Random Access Memory) (not illustrated) used as a work area, the predetermined area of the aforementioned internal RAM or RAM 12 to be described later. Control section 10 sends control signals to each section according to control programs stored into ROM 11 to be described later, and provides overall control of the operation of image forming system 101.

ROM 11 is a nonvolatile memory or a flash memory (Flash Read-Only Memory) rewritable for updating, and is used to store the initial starting program corresponding to control section 10, basic operation program for controlling each section, and processing program for various processing operations.

RAM 12 is a volatile memory, for example, a SDRAM (Synchronous Dynamic RAM), and provides a memory area for expanding various items of data when control section 10 executes various processing operations.

Operation section 13 is a pressure sensitive type touch panel (resistive film pressure type) where a transparent electrode is arranged in a grid pattern, and is covered and installed on the display screen of display section 14 to be described later. Operation section 13 outputs an operation signal inputted from the touch panel, to control section 10, and is used to provide operation instructions and various settings. It should be noted that the aforementioned transparent electrode is preferred to have a high degree of transmittance from the viewpoint of visibility.

Display section 14 comprises a display such as an LCD (liquid crystal display) and CRT (cathode ray tube). Based on the display data inputted from control section 10, display section 14 displays image data on the display screen.

Image reading section 15 contains a scanner arranged on the bottom of the transparent contact glass. The document sent to the contact glass from the ADF (Automatic Document Feed Apparatus) is read by the scanner and the image data obtained therefrom is sent to control section 10. The scanner comprises a light source, a lens, a CCD (charge coupled device) and others. The reflection of the light emitted from the light source to the document for scanning is applied to lens to form an image, and image data is obtained.

Image forming section 16 comprises an image write section having an exposure section, a photosensitive drum and a developing section, and a fixing section for fixing the written image (not illustrated). According to the printing instruction from control section 10 and printing data, an electrostatic latent image is formed on the photosensitive drum surface. Image forming section 16 allows the developing section to deposit toner so that toner image is formed on the surface of the photosensitive drum. This toner image is transferred onto the recording medium and is outputted subsequent to having been fixed.

In the present embodiment, an example of using electrophotographic technology will be described. However it is also possible to use an inkjet printing method, thermal sublimation method or other printing methods.

External interface 17 is a communication module capable of communicating with an external device through serial communication. In conformity to the instruction coming from control section 10, external interface 17 exchanges data with finishing apparatus 2.

Transmission control section 18 comprises a radio line, a MODEM (Modulator-Demodulator), a router, a TA (Terminal Adaptor) and others. In response to the control signal from control section 10, transmission control section 18 communicates with the external equipment with the aforementioned communication network 3.

Finishing apparatus 2 comprises control section 20, ROM 21, RAM 22, input section 23, output section 24, first external interface 25, second external interface 26, third external interface 27, first communication switching control section 28*a* and second communication switching control section 28*b*, and is electrically connected through a bus 29. Finishing apparatus 2 is also provided with first communication switching section SW1 controlled by first communication switching control section 28*a*, and second communication switching section SW2 controlled by second communication switching control section 28*b*.

Control section 20 includes a CPU and communication IC 20*a* to be described later. The CPU has an internal RAM (not illustrated). In conformity to the various programs stored in the ROM 21 to be described later and control instruction coming from image forming apparatus 1, the internal RAM sends a control signal to each section and controls the overall operation of finishing apparatus 2.

ROM 21 is a nonvolatile memory or a flash memory (Flash Read-Only Memory) rewritable for updating, and constitutes a storage area for storing the initial starting program corresponding to the control section 20, basic operation program for controlling each section, and processing program for various processing operations.

RAM 22 is a volatile memory, for example, an SDRAM, and provides a memory area for expanding various items of data when control section 20 executes various processing operations.

Operation section 23 comprises a plurality of conveyance roller pairs each having a drive roller and a driven roller, and provides a conveyance path from the reception of recording paper to a target apparatus (not illustrated). Input section 23 sends the recording paper with an image recorded thereon ejected from image forming apparatus 1, to the aforementioned finishing section.

Output section 24 comprises a plurality of conveyance roller pairs, and sends the recording paper ejected from a target apparatus to the next finishing section or an ejection tray (not illustrated).

First external interfaces 25, 26 and 27 are communication modules capable of communicating data with an external device by serial communication. According to the instruction from control section 20, first external interface 25 exchanges data with image forming apparatus 1 through first communication switching section SW1. Similarly, second external interface 26 exchanges data with image forming apparatus 2, and third external interface 27 transmits and receives data through second communication switching section SW2.

If there is no finishing section to be connected thereafter, second external interface 26 detects it and conveys the detected information to control section 20. This procedure makes it clear thereafter that a target apparatus is located at the end terminal of the connection.

By sending a drive signal to first communication switching section SW1 through a control line (not illustrated) in response to the control instruction from control section 20, first communication switching control section 28a as a first switching device switches the electric communication path of first communication switching section SW1. Similarly, second communication switching control section 28b as a second switching device switches the electric communication path of second communication switching section SW2.

First communication switching section SW1 and second communication switching section SW2 are contact point type release switches for switching by direct mechanical contact, or contactless switches wherein semiconductor devices such as MOSFET (Metal Oxide Semiconductor Field-Effect Transistor) and thyristor are used as switches.

Referring to FIG. 3 (a), the following describes the communication path of image forming system 101. Image forming system 101 is equipped with a communication path for transmission/reception of data, and a communication IC (Integrated Circuit) for transmission/reception of communication data.

Communication IC 20a provided in each finishing section comprises an inputting and outputting terminal of data to and from first external interface 25 for normal exchange of data with the equipment of the previous stage, an inputting and outputting terminal of data to and from second external interface 26 for normal exchange of data with the equipment of the subsequent stage and an inputting terminal of data from third external interface 27, for receiving only the data from second communication switching section SW2, as a line dedicated to rewriting a program employed in each finishing section. Normally, each terminal and each interface described above are combined as a communication port and included in communication IC 20a.

Communication IC 20a receives and stores the communication data having a item-number numbered from the direction of image forming apparatus 1 in the normal communication mode, and sends the incremented data to the subsequent stage. Judging from these numbers, each finishing section determines the order of connection from image forming apparatus 1.

The aforementioned determination of connection position need not be restricted to the aforementioned configuration. It can be determined in the reverse direction from the terminal finishing section.

Communication path k 01a is designed for connection through first communication switching section SW1 in order to send data from communication IC 10a to communication IC 20a. Communication path k 01b is intended to send data from communication IC 20a to communication IC 10a. The path toward first external interface 25 is selected in the reset mode or in the absence of control instruction in first communication switching section SW1.

Communication path k 13 is designed for connection between first communication switching section SW1 and second communication switching section SW2. Communication path k 33 is intended for connection with second communication switching section SW2 of an adjacent finishing section. The path for connection from communication path k 13 to communication path k 33 is selected in the reset mode or in the absence of control instruction second communication switching section SW2.

Communication path k 21a is designed for connection with communication IC 20a of the adjacent finishing section in order to send data to the terminal. Conversely, communication path k 21b is designed for connection with communication IC 20a of the adjacent finishing section in order to send data to image forming apparatus 1.

In the subsequent description, the direction of communication from image forming apparatus 1 to a target apparatus at the terminal is referred to as the forward direction, whereas the direction opposite thereto is referred to as the reverse direction.

Thus, the first communication line shown by a heavy line in FIG. 3 (b) is formed in the normal communication mode wherein no switching operation is conducted in conformity to the control instruction especially from first communication switching control section 28a and second communication switching control section 28b.

Figure 4:
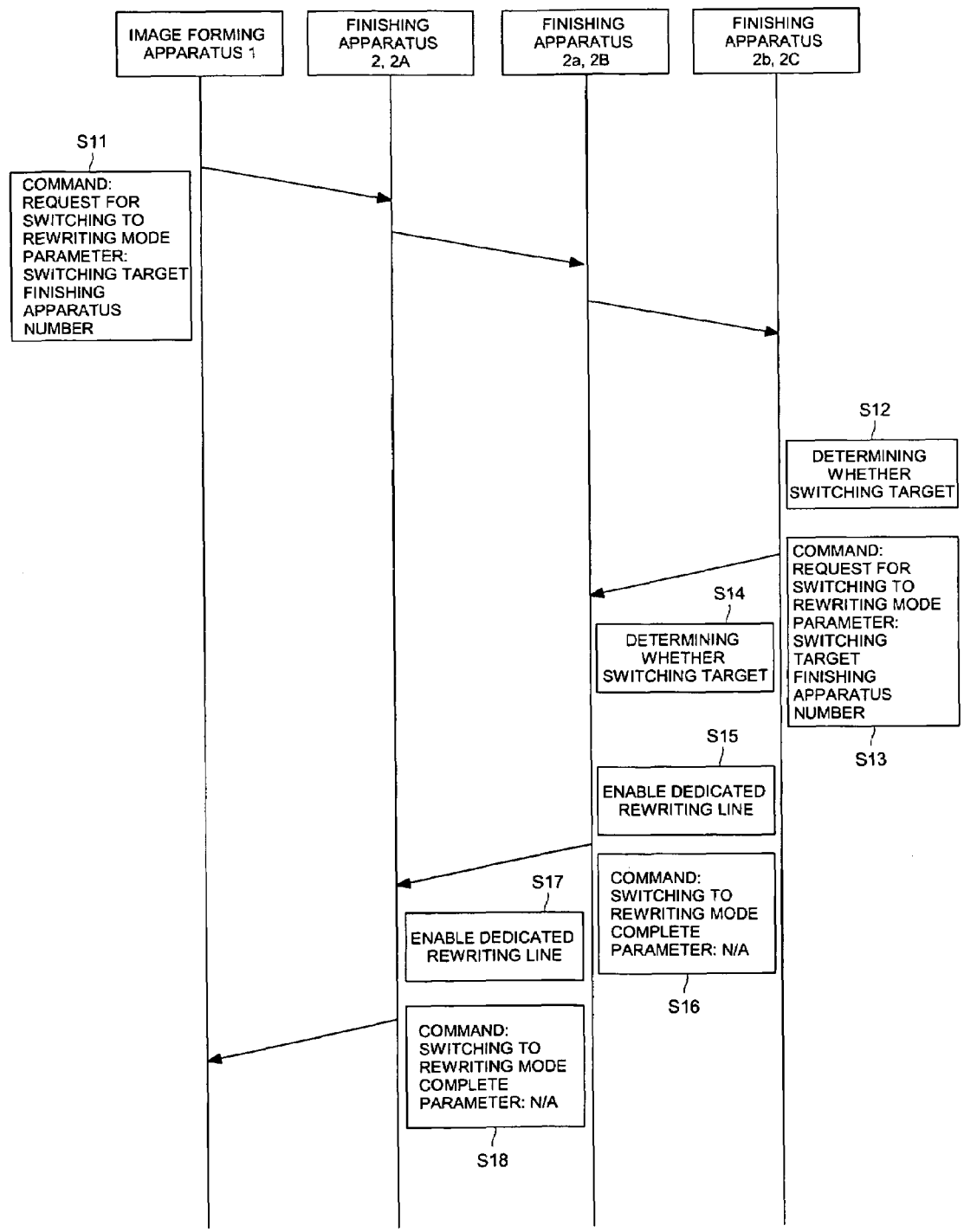
FIG. 4 is a diagram showing a communication path switching sequence for rewriting the operation program of the finishing apparatus 2a of the image forming system 101.

Referring to FIG. 4, the following describes the sequence of switching a communication path by first communication switching section SW1 and second communication switching section SW2 when the operation program of finishing apparatus 2a is rewritten.

Control section 10 sends data including a shifting instruction in the forward direction to shift the mode of a predetermined finishing apparatus to the rewriting mode for rewriting the operation program of the predetermined finishing section in image forming system 101 and the number showing finishing apparatus 2a to be rewritten (Step S11).

Upon arrival of the aforementioned data to finishing apparatus 2b as an end apparatus, control section 20 determines whether it is a target apparatus to be rewritten (Step S12). Since it is not a target apparatus to be rewritten, control section 20 sends the received data to finishing apparatus 2a located in the reverse direction (Step S13).

After Step S13, control section 20 of finishing apparatus 2a makes the same decision as finishing apparatus 2b did (Step S14). Control section 20 determines that it is a target apparatus to be rewritten and switches second communication switching section SW2 to an enabled position where the dedicated line is ready for rewriting (Step S15). Then it sends data showing that a mode has been switched to the rewriting mode, to finishing apparatus 2 located in the reverse direction (Step S16).

For a target apparatus to be rewritten, the aforementioned process of enabling the line dedicated for rewriting to be ready is to switch second communication switching section SW2 to third external interface 27. For a target apparatus provided with first communication switching section SW1, the aforementioned process of enabling the line dedicated for rewriting to be ready is to switch switching section SW1 to the direction of the communication path k 13. Except for a target apparatus to be rewritten, switching is not performed if first communication switching section SW1 is not provided.

After Step S16, control section 20 of finishing apparatus 2 enables the line dedicated for rewriting (Step S17) to be ready. The received data is sent directly to image forming apparatus 1 located in the reverse direction (Step S18). When aforementioned data has been received, control section 10 determines that the communication path is switched from a normal communication mode to a rewriting mode.

Referring to FIG. 3 (c), the following describes image forming system 101 after switching positions have been switched to the communication path according to the aforementioned sequence. The heavy line in the figure indicates the second communication line to be used by the switching.

As shown in FIG. 3(c), the communication path of image forming system 101 is so configured that communication IC 10a and communication IC 20a of finishing apparatus 2a to be rewritten are directly connected in the forward direction. Other communication paths are configured in the same manner as in the normal communication mode. This arrangement allows the communication from image forming apparatus 1 to finishing apparatus 2a to be performed without using finishing apparatus 2 located between image forming apparatus 1 and finishing apparatus 2a. This signifies a higher communication speed.

The aforementioned description of the present embodiment refers to the switching of communication path used for rewriting the operation program of finishing apparatus 2a. However, finishing apparatus 2a can be finishing apparatus 2 or finishing apparatus 2c. The present invention is not limited to this embodiment. Further, it is also possible to configure image forming system 101 in such a way that, after transmission of data in Steps S13, S16 and S18, each finishing section is set at the communication speed higher than normal one, and upon receipt of the data showing termination of the switching to the rewriting mode, the image forming apparatus 1 is switched to the communication speed, thereby achieving still faster data communication.

Figure 5:
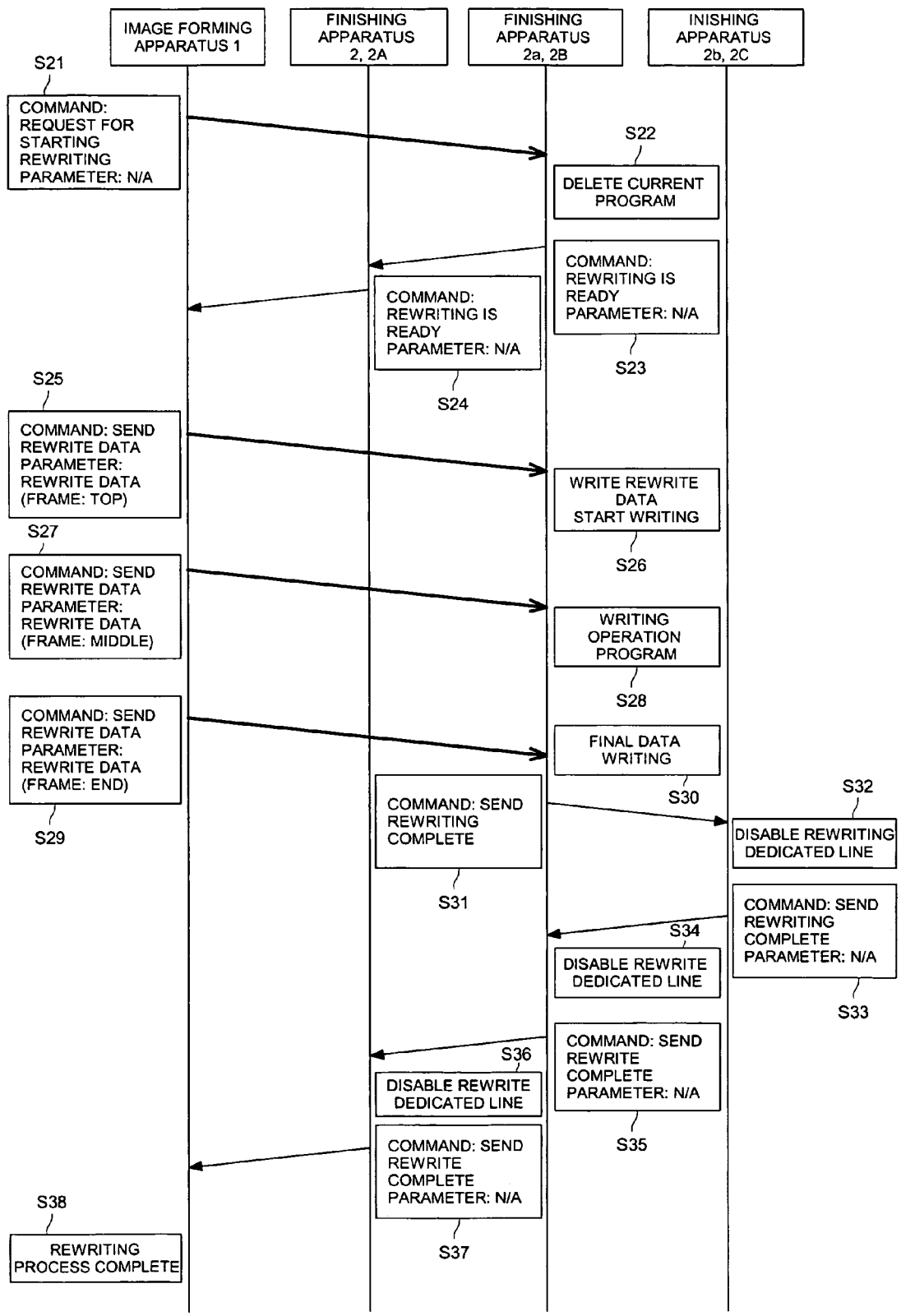
FIG. 5 is a diagram illustrating the finishing apparatus 2a operation program rewriting sequence after switching the communication path of the image forming system 101.

Referring to FIG. 5, the following describes the operation program rewrite sequence in the image forming system 101 after the communication path has been switched by the aforementioned sequence. In FIG. 5, a heavy line is used to indicate the communication conducted via direct path from image forming apparatus 1 to finishing apparatus 2a, thereby setting it apart from a normal communication mode.

Control section 10 sends a rewrite-starting instruction to finishing apparatus 2a (Step S21). The rewrite-starting instruction is given by designating the program to be rewritten.

After Step S21, control section 20 of finishing apparatus 2a deletes the designated existing operation program (Step S22), and data indicating that rewriting is enabled is sent to finishing apparatus 2 located in the reverse direction. Control section 20 of finishing apparatus 2 sends the data coming from finishing apparatus 2a, directly to image forming apparatus 1.

After Step S24, image forming apparatus 1 divides the data to be written into the top position of the frame (Step S25), intermediate position of the frame (Step S27) and the end position of the frame (Step S29), and sends the data, together with the command indicating that the data is to be rewritten, to the finishing apparatus 2a. It is also possible to arrange the data to be sent, in such a way that checksum data is added for each frame for error detection.

Control section 20 of finishing apparatus 2a writes each of received items of data to be rewritten and stores it as a new operation program (Step S26, Step S28 and Step S30). When writing of the final data item has been confirmed in Step S30, the command indicating that rewriting has been completed is sent to finishing apparatus 2b located in the forward direction (Step S31). It is also possible to arrange a configuration such that if an error has been detected by the checksum in the Step S31, a request is made to resend the relevant frame so that it is received again.

After Step S31, control section 20 of an end apparatus (finishing apparatus 2b) receives a command indicating completion of rewriting via first external interface 25. This procedure disables the line dedicated for rewriting (Step S32), and the rewritten completion command is sent to the finishing apparatus 2a located in the reverse direction (Step S33).

The process of disabling the line dedicated for rewriting is to switch first communication switching section SW1 and second communication switching section SW2 to the normal communication path.

After Step S33, control section 20 of finishing apparatus 2 and finishing apparatus 2a disable each of the lines dedicated for rewriting upon receipt of the rewrite command (Steps S34 and S36) and send a rewrite completion command in the reverse direction (Steps S35 and S37). The process of rewriting is completed when control section 10 has received the rewrite completion command thereafter.

As described above, in the communication in rewriting the operation program of a predetermined finishing apparatus, image forming system 101 including finishing apparatuses connected in series switches first communication switching section SW1 and second communication switching section SW2, thereby directly connecting the communication path from image forming apparatus 1 to the relevant finishing apparatus, without using in-between communication control section or communication ICs.

This arrangement increases the speed in data transmission to finishing apparatuses connected in series, and reduces the time for updating of operation programs.

The above description of the present invention refers to the communication for updating of operation programs. Without being restricted thereto, the present invention is also applicable, for example, to the case where high-volume image data is sent.

Embodiment 2

The following describes image forming system 101a as a second invention of the present invention. To avoid duplication, with regard to the same configuration in image forming system 101 which is assigned with the same reference number, the explanation will be omitted. The difference from image forming system 101 is that each finishing apparatus has a first communication switching section SW1, a second communication switching section SW2 and a switching control section thereof.

Figure 6:
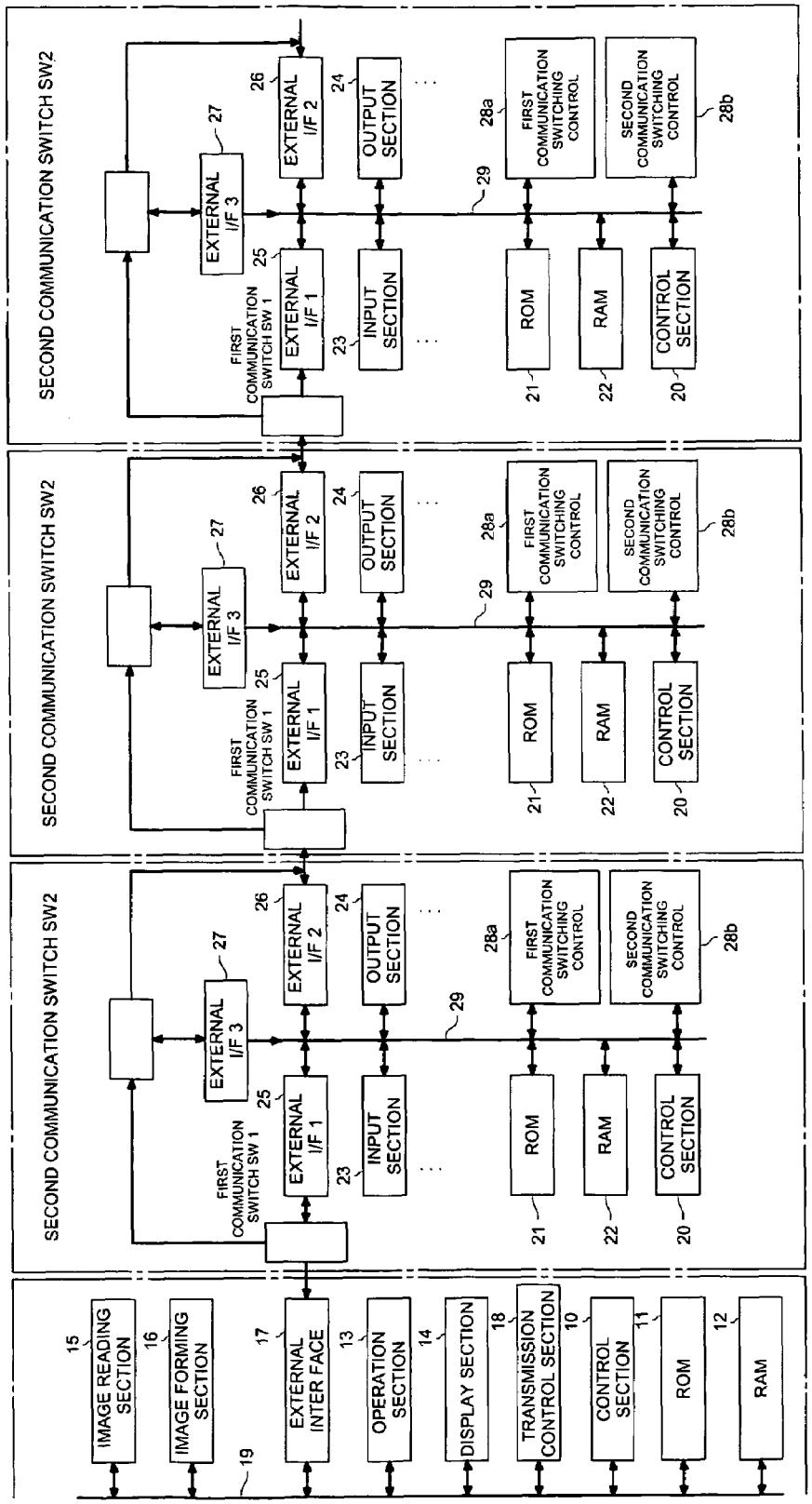
FIG. 6 is a diagram showing the internal structure of the image forming system 101a as second embodiment of the present invention.

FIG. 6 is a diagram showing the overall structure of image forming system 101a as an embodiment of the present invention. Image forming system 101a includes an image forming apparatus 1 and finishing apparatuses 2a-2c, each containing first communication switching section SW1, second communication switching section SW2, first switching control section 28a and second switching control section 28b. The image forming apparatus 1, finishing apparatus 2a, finishing apparatus 2b and finishing apparatus 2c are connected in that order via first communication switching section SW1.

Figure 7:
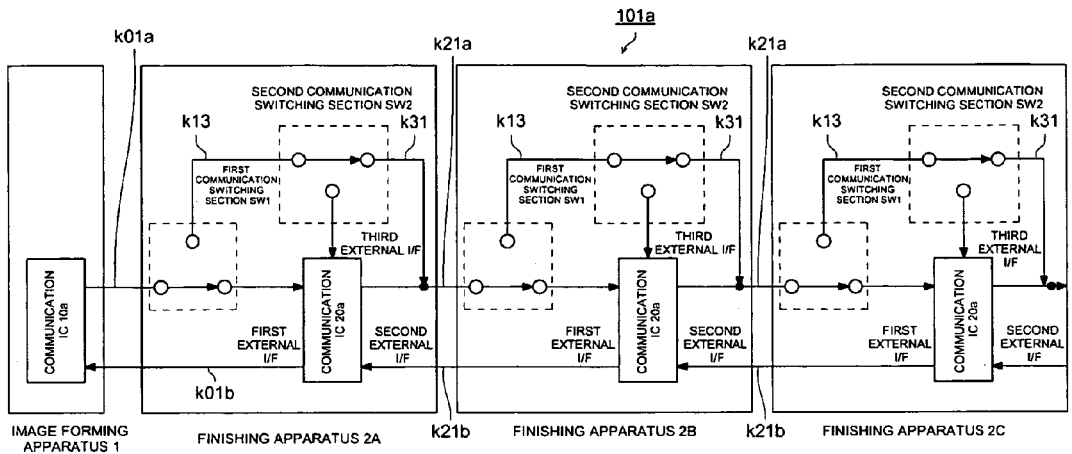
Figure 7:
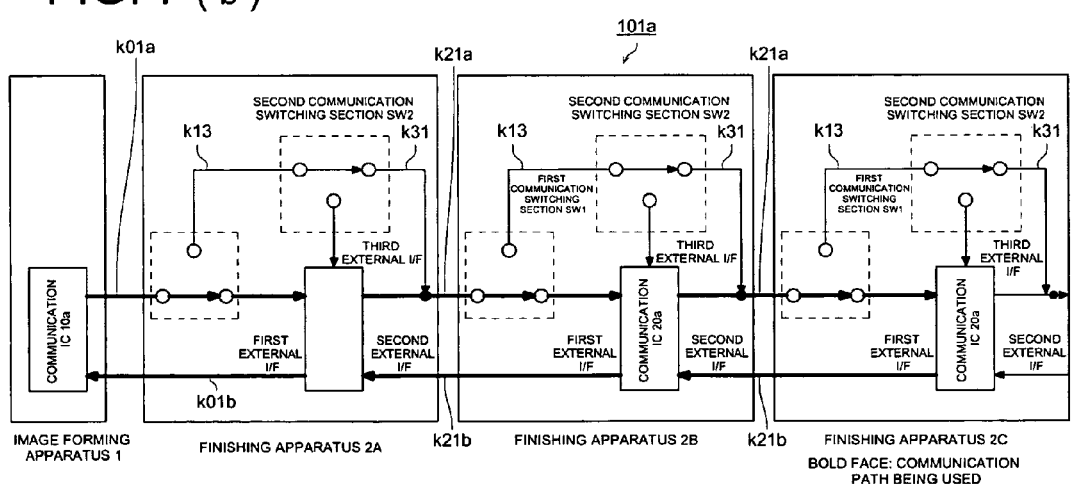
Figure 7:
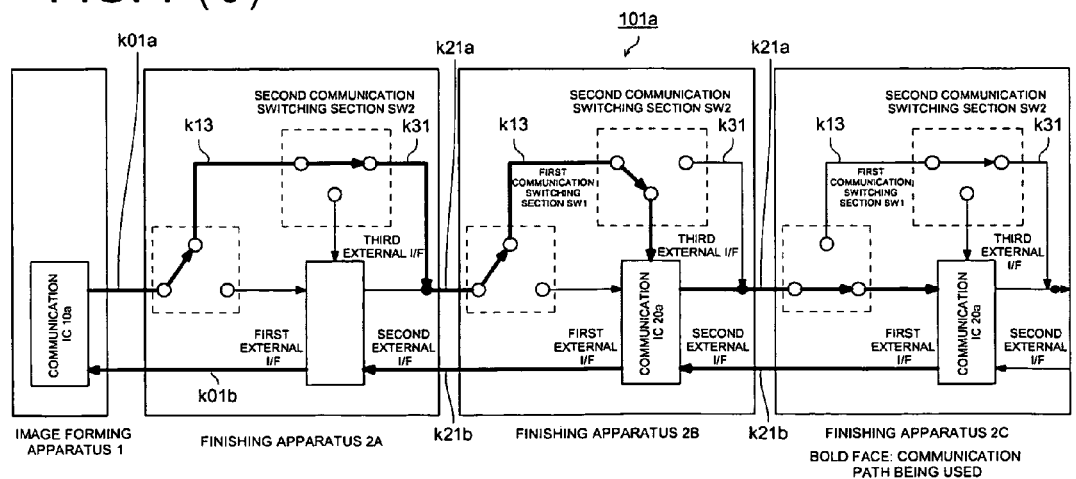

Referring to FIG. 7 (a), the following describes the communication path of image forming system 101a. Each finishing apparatus of image forming system 101a includes second communication switching section SW2 wherein the communication path from communication path k13 in the normal mode is switched to a communication path k31 to be connected to the communication path k21a, and first communication switching section SW1.

The communication path of image forming system 101a in the normal communication mode is shown by a heavy line in FIG. 7 (b).

The aforementioned arrangement allows users to freely arrange each finishing apparatuses in image forming system 101a. According to the arrangement, it is not necessary to place a predetermined finishing apparatus at the position being closest to image forming apparatus 1.

Figure 8:
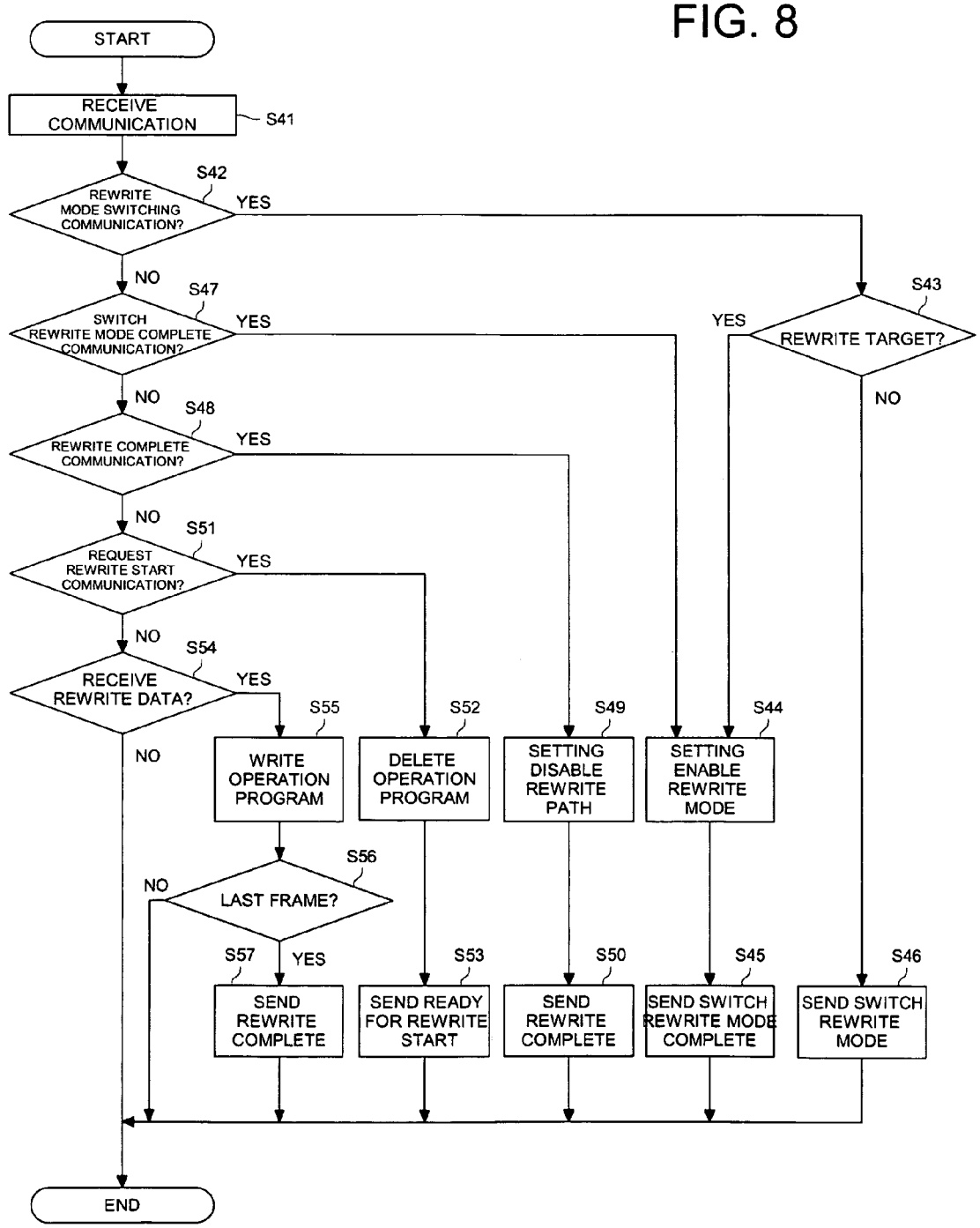
FIG. 8 is a flowchart representing the operation processing of each finishing apparatus when executing the sequence of updating the operation program by switching the path in the second embodiment.

Referring to a flowchart shown in FIG. 8, the following describes each finishing apparatus of image forming system 101a for executing the sequence of updating the operation program by switching the path shown in FIGS. 4 and 5. The processing described below comprises Steps S41-S57 implemented by control section 20.

Control section 20 receives communication and checks data in the communication (Step S41).

After Step S41, control section 20 determines whether the aforementioned communication data is data indicating a request for switching to rewriting mode, the communication data being received by first external interface 25 or third external interface 27 of the finishing apparatus 2c as an end apparatus in the finishing apparatuses in image forming system 101a (Step S42).

If control section 20 determines that requirements are positive in Step S42 (YES in Step S42), then control section 20 determines whether the apparatus is the one to be rewritten from the number indicating the item to be rewritten (Step S43). If the apparatus is not the one to be rewritten (NO in Step S43), then the data is directly sent to the reverse direction (Step S46), and the processing is completed.

If the apparatus is the one to be rewritten (YES in Step S43), then the path for rewriting is enabled (Step S44), and the data indicating completion of switching to a rewriting mode is sent in the reverse direction (Step S46), and the processing is completed.

It should be noted that the process of enabling the path for rewriting is to switch first communication switching section SW1 to communication path k 13, and to switch second communication switching section SW2 to third external interface 27.

If control section 20 determines that the requirements are negative (NO in Step S42), control section determines whether the data indicates completion of switching to the rewriting mode (Step S47). If so (YES in Step S47), processing of aforementioned Steps S44 and S45 are performed. Then these processes are completed.

Image forming system 101 executes the sequence shown in FIG. 4 based on the processing carried out in the aforementioned Steps S42 and S47 in the case of YES, whereby the communication path is switched to the position in which the operation program is rewritten.

FIG. 7 (*c*) shows that switching has been made to select the second communication line in order to update the operating program of finishing apparatus 2b based on the aforementioned processing. As shown in FIG. 7 (*c*), in the communication path of image forming system 101a, the communication IC 10a is directly connected with communication IC 20a of the finishing apparatus 2b. Other communication paths remain in the same arrangement as in the normal communication mode. This provides the same effect as that shown in FIG. 3 (*c*).

When control section determines that the data does not indicate completion of switching to the rewriting mode in Step S47 (NO in Step S47), control section 20 determines whether it is the data showing completion of rewriting which is received by first external interface 25 or third external interface 27 of finishing apparatus 2c as an end apparatus (Step S48). If so (YES in Step S48), then the rewrite path is disabled (Step S49), and the data is directly sent in reverse direction (Step S50). All steps in this image processing are completed.

The step of disabling the rewrite path in this case is to switch first communication switching section SW1 to first external interface 25, and to switch second communication switching section SW2 to the communication path k 31.

When control section determines that the data does not indicate completion of rewriting in Step S48 (No in Step S48), control section 20 determines whether it is a rewrite-starting instruction (Step S51). If so (YES in Step S51), the operation program is deleted (Step S52), and the data indicating rewrite-start being enabled is sent in the reverse direction (Step S53).

When control section 20 determines that the data is not the rewrite-starting instruction in Step S51 (NO in Step S51), control section 20 determines whether the data received is the rewrite data (Step S54). If so (YES in Step S54), that data is written and the operation program is updated (Step S55). Control section 20 determines whether the data is the final data of the frame (Step S56).

If control section 20 determines that the data is the final data of the frame in Step S56 (YES in Step S56), then a command for completion of rewriting is sent in the reverse direction (Step S57), and this processing is completed.

When control section 20 determines that the data is not the final of the frame (NO in Step S56), and it determines that the data received is not the rewrite data in Step S54 (NO in Step S54), then this processing is completed.

As described above, in image forming system 101a, each finishing apparatus contains first communication switching section SW1, second communication switching section SW2 and communication path thereby. When the aforementioned sequence is executed, the path is switched and operation program is updated.

Thus, image forming system 101a allows the communication connectors for various apparatuses to be standardized into an input/output connector, and hence permits the layout of each apparatus to be freely arranged. Further, each finishing apparatus incorporates a communication path for rewriting, so that high-speed transfer can also be achieved in the combination with a conventional image forming system.

According to these embodiments, data communication from an image forming apparatus to a particular finishing apparatus is carried out directly. This arrangement ensures high-speed data transfer, and high-speed handling of complicated processes carried out by the finishing apparatus can be achieved by data communication from the image forming apparatus. This arrangement also reduces the updating time of operation programs in the finishing apparatus, and minimizes possible errors at the time of data transfer because of direction connection with a sender.

According to these embodiments, the second communication line can be switched from the first one, and this permits an effective use of the first communication line.

According to these embodiments, a finishing apparatus necessary to be directly connected to an image forming apparatus is selected by the first switching device. This ensures a simpler structure, and improves switching speed and apparatus reliability while cutting the production costs.

According to these embodiments, since each finishing apparatus has a second switching device, it is not necessary to provide a second communication line in each of a plurality of finishing apparatuses with each corresponding second communication line. This arrangement ensures a still simpler structure.

According to these embodiments, the connector employed in each finishing apparatus for communication linkage with an image forming apparatus can be integrated into the first communication line. Consequently, the layout of each finishing apparatus can be freely changed. And it also permits high speed data transfer even in a conventional image forming apparatus having only a first communication line.

What is claimed is:

1. An image forming system comprising:
   an image forming apparatus for forming an image onto a recording medium; and
   a plurality of finishing apparatuses for processing the recoding medium ejected from the image forming apparatus, each finishing apparatus of the plurality of finishing apparatuses comprising:
   a communication device for controlling communication between the image forming apparatus and the finishing apparatus itself;
   a first communication line for sending and receiving data between the finishing apparatus and the image forming apparatus through the communication device for controlling the finishing apparatus; and
   a second communication line adapted for bypassing the communication device arranged in the finishing apparatus.

2. The image forming system of claim 1,
   wherein the first communication line is provided for transmitting data between the image forming apparatus and an adjacent finishing apparatus through the communication device, and the second communication line is provided for transmitting data between the image forming apparatus and the adjacent finishing apparatus bypassing the communication device.

3. The image forming system of claim 1,
   wherein the first communication line is provided for transmitting data using the communication device, and the second communication line is provided for transmitting data without using the communication device.

4. The image forming system of claim 1, further comprising;
   a switching device for selecting the first communication line or the second communication line based on the data for controlling the each finishing apparatus.

5. The image forming system of claim 4,
   wherein the switching device comprises a second switching device for connecting the second communication line to one of the finishing apparatuses.

6. The image forming system of claim 5,
   Wherein the switching device further comprises a first switching device for selecting the first communication line or the second communication line corresponding to the data.

7. The image forming system of claim 6,
   wherein the first switching device is provided in the finishing apparatus directly connected the image forming apparatus.

8. The image forming system of claim 6,
   wherein the first switching device is provided in each of the finishing apparatus.

9. The image forming system of claim 8,
   wherein the second communication line of each finishing apparatus has a communication path joined to the first communication line bypassing the communication device.

10. The image forming system of claim 1,
    wherein the first communication line transmits data for controlling the finishing apparatus in a normal communication mode and the second communication line transmits an operation program running on a CPU of the finishing apparatus in a rewritten mode.

11. A communication method of an image forming system including an image forming apparatus for forming an image onto a recording medium, and a plurality of finishing apparatuses connected with the image forming apparatus for processing the recoding medium ejected from the image forming apparatus, each finishing apparatus of the plurality of finishing apparatuses includes a first communication line for sending and receiving data, a communication device for controlling communication between the image forming apparatus and the finishing apparatus, and a second communication line for bypassing the communication device, the communication method comprising the steps of:
    sending data including an instruction for shifting to a rewriting mode from the image forming apparatus to the finishing apparatus;
    receiving the instruction by the finishing apparatus; and
    controlling the first communication line and the second communication line based on the instruction so that rewrite data outputted from the image forming apparatus bypasses the communication device and is transmitted to one of the finishing apparatuses.

12. A finishing system employed in an image forming system having an image forming apparatus and a plurality of finishing apparatuses for processing a recoding medium ejected from the image forming apparatus, each finishing apparatus of the plurality of finishing apparatuses comprising:
    a communication device for controlling communication between the image forming apparatus and the finishing apparatus itself;
    a first communication line for sending and receiving data between the finishing apparatus and the image forming apparatus through the communication device for controlling the finishing apparatus; and
    a second communication line adapted for bypassing the communication device arranged in the finishing apparatus.

13. The finishing system of claim 12,
    wherein the first communication line is provided for transmitting data between the image forming apparatus and an adjacent finishing apparatus through the communication device, and the second communication line is provided for transmitting data between the image forming apparatus and the adjacent finishing apparatus bypassing the communication device.

14. The finishing system of claim 12,
    wherein the first communication line is provided for transmitting data using the communication device, and the second communication line is provided for transmitting data without using the communication device.

15. The finishing system of claim 12, further comprising;
    a switching device for selecting the first communication line or the second communication line based on the data for controlling the each finishing apparatus.

16. The finishing system of claim 15,
    wherein, the switching device comprises a second switching device for connecting the second communication line to one of the finishing apparatus.

17. The finishing system of claim 16,
    wherein the switching device further comprises a first switching device for selecting the first communication line or the second communication line corresponding to the data.

18. The finishing system of claim 17,
    wherein the second communication line of each of the finishing apparatus has a communication path joined to the first communication line bypassing the communication device.

19. The finishing system of claim 12,
    wherein the first communication line transmits data for controlling the finishing apparatus in a normal communication mode, and the second communication line transmits an operation program running on a CPU of the finishing apparatus in a rewritten mode.

20. A communication method of a finishing system used in an image forming system including an image forming apparatus for forming an image on a recording medium, and a plurality of finishing apparatuses for processing the recoding medium ejected from the image forming apparatus, each finishing apparatus of the plurality of finishing apparatuses having a first communication line for sending and receiving data for controlling the finishing apparatus, a communication device for controlling the data, and a second communication line for transmitting data bypassing the communication device, the communication method comprising the steps of:

receiving data including an instruction for shifting to a rewriting mode; and controlling the first communication line and the second communication line based on the instruction so that rewrite data outputted from the image forming apparatus bypasses the communication device and is transmitted to one of the finishing apparatus.

* * * * *